METHOD OF MULTI-TRACK, TWO-GAP, FERRITE MAGNETIC HEADS DESIGNED ESPECIALLY FOR DIGITAL RECORDING

Filed Jan. 16, 1968 7 Sheets-Sheet 1

United States Patent Office 3,543,396

Patented Dec. 1, 1970

3,543,396

METHOD OF MULTI-TRACK, TWO-GAP, FERRITE MAGNETIC HEADS DESIGNED ESPECIALLY FOR DIGITAL RECORDING

Zbigniew Illg, Siennicka 36a–16; Wojciech Walczak, Piekna 7/9–93; Jan Zaluska, Zawiszy 30–110; Czeslaw Szymański, Baluckiego 18–8; Edward Seremak, Karola Wojcika 14–16; and Henryk Domoslawski, Zagosciniec 12, all of Warsaw, Poland Filed Jan. 16, 1968, Ser. No. 698,196

Claims priority, application Poland, Jan. 17, 1967, P 118,532; June 17, 1967, P 121,200

Int. Cl. H01f 7/06

U.S. Cl. 29—603 15 Claims

ABSTRACT OF THE DISCLOSURE

A method for producing multi-track, two-gap ferrite magnetic leads, in which ferrite body shapes are provided with gap-forming surfaces, the body shapes are positioned with these surfaces forming two gaps, bonding the body shapes with material filling the gaps, cutting the body shapes to provide multiple pairs of heads each with a pair of core legs, and removing some excess material provided on the initial body shapes.

Figure 1:
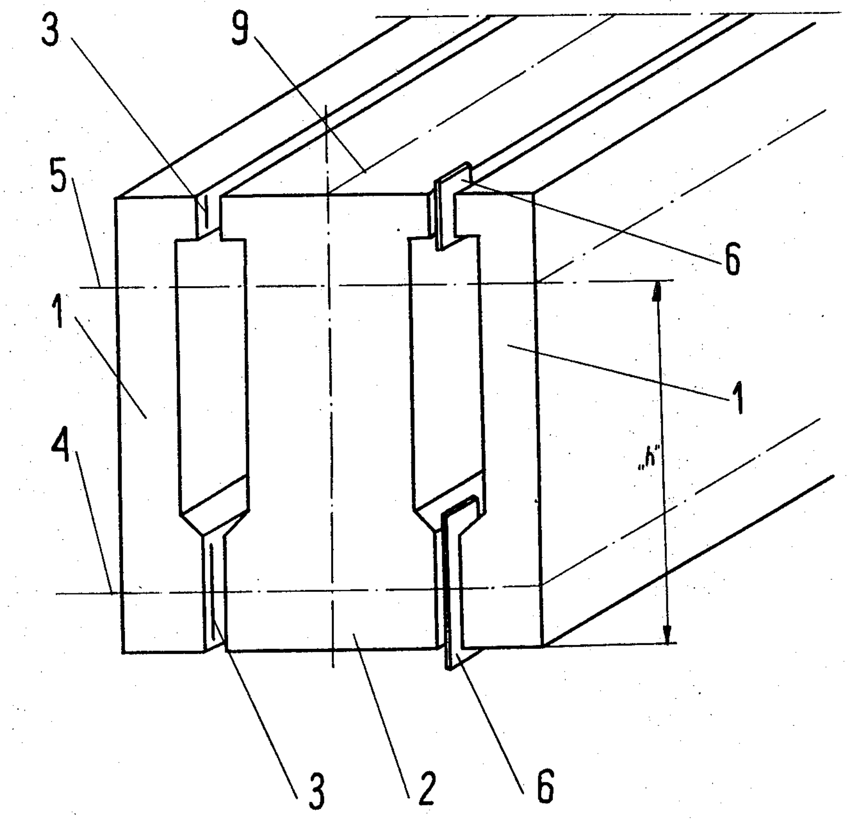

The multi-track, two-gap, form of ferrite heads is used most frequently in magnetic tape memories. The condition of extremely exact linearity of gaps for individual tracks of the recording and and reproducing heads and extremely exact parallelity of recording and reproducing head gaps to each other, must be met in heads of this type. Moreover the coincidence of the axes of the cores of individual recording and reproducing heads is also a necessary condition. Besides, the width of the track of the individual recording head must be a litlte wider than that of the reproducing head. This results from the particular operating conditions of a multi-track, two-gap head wherein the reproducing head should always be within the width of a recorded track, with allowance for tape-transport tolerance. In addition to those specified above, another basic condition is that the distance between recording and reproducing head gaps forming the two-gap head is to be 0.15″ or 0.3″ and 3.81 mm. or 7.62 mm. respectively.

Among disclosure of methods for making multi-track, single-gap heads are those in Polish Patent No. 54,159 and German Patents No. 1,215,764 and No. 1,215,765.

In the said Polish patent specification there is described a structure which can be fabricated, up to the last operation, using a method which allows all the track heads to be kept mechanically inseparable by means of an excess of the ferrite face material. However, the described method solves the problems of fabrication of a multi-track, single-gap head only. According to the therein given description, the multi-track two-gap head is assembled of two single-gap heads, thus requiring the use of difficult and complicated operations when aligning both units, and increasing the difficulties in achieving parallelity of the gaps. Usually when such processes are performed, the application of special designing and engineering procedures, such as the use of so called combs for stacking elementary track heads, becomes necessary and these results in excess tolerance.

In the German specification there are described only the temperature conditions necessary for bonding two ferrite mouldings by means of a glass wire. The mentioned German specification may show, at most, the application of only a single operation of bonding two mouldings, the further stages of multi-gap head fabrication process not being disclosed therein. The mouldings, bonded as specified, are cut into elementary heads, and then after coiling and bridging-over the core of each one they are stacked into the multi-track units. This is deducted from the Philips catalogue which illustrates objectively the method of providing screens and stacking single-track cores into a multi-track, single-gap unit. The above mentioned method makes it essentially impossible to produce a nine-track head for a ½″ magnetic tape, according to the ISO Standard requirements as far as the specified dimensions of individual track heads and their mutual spacing are to be observed.

The head design according to the Polish patent using the epoxy resin compound on the machined ferrite cores may be unsatisfactory in some cases. The use of epoxy resin as a mechanical bond of the whole unit does not always provide the head with sufficient shake-proof properties, and even the resistance to shrinkage appearing during the resin polymerization offers problems; thus it is advantageous to introduce some design modifications to provide a better structure.

The aim of this invention is therefore to provide a process capable of producing with the required precision a multi-track, two-gap head, and also shall make it possible to provide a head of this type having great mechanical strength.

According to the invention the problem has been solved through the machining of a multi-track, two-gap head so that three cores forming parts of the elementary track heads are kept inseparable by means of an excess of material throughout the processing, which is performed so that the first operation is the grinding of the body shapes to form the head blocks or blanks, those being bonded by means of a glass aggregate cement along gap-forming surfaces, the second operation is a cross-cut of the bonded shapes which have been previously bonded to a fixing plate, wherein the first cut is made along the longitudinal axis of the whole block to form a space for an inter-head screen in the middle body shape, the second cut is made along the inter-head space axis to form the core legs for receiving head windings, the third cut deepens the spaces along the inter-track space axes to form the pole-shoe parts of the individual-track head cores intended to become recording heads, while the fourth cut forms the pole-shoe parts of the individual-track heads intended to become reproducing heads, wherein the first and the third cuts are made a shade deeper than the actual height of the cores with the pole shoes, and the fourth cut is made over the full height of the shapes but only in that half of the assembly corresponding to the reproducing head, and to the axis of the inter-head screen space, and then the coils, screens, paramagnetic separators and cores with armature are assembled, and the whole head assembly is bonded into a housing and covered with a layer of epoxy resin layer, and only then, during the last operation the face of this head assembly is ground to take off the excess material and to separate the heads magnetically within the range of elementary tracks and gaps as well as to shape the head face.

A version of the head, produced by the method according to the invention, consisting of two external body shapes and a middle body shape, which latter is made either symmetrically to the external body shapes or in the form of a prism, and producing asymmetrical geometry of the magnetic circuit shape, has a part of uncut ferrite material near its mid-plane which exhibits some magnetic bridging-over to the magnetic circuits of the individual-track-head cores and keeps the whole unit mechanically inseparable even after grinding off the engineering excess, but the inter-track screen is made of a single piece of foil in form of a rectangular wave.

The described method of manufacturing of multi-track, two-gap ferrite heads in comparison with other known methods has a number of significant advantages.

Among the substantial advantages there should be mentioned the practicability of obtaining almost uniform physic-chemical properties for all track heads, as there is in the known methods some chance of stacking several heads of a ferrite material which have originated from different production stocks. The provision of the material excess permits carrying out the entire machining of the mouldings and the assembling of heads in a mechanically inseparable unit. That renders its possible to secure, during the machining, suitable axiality of tracks of individual recording and reproducting heads, a suitable parallelity of the head gaps and their linearity with respect to all the tracks with a minimum number of structural components.

The cross-cutting of the ferrite body shapes enable the obtaining of the core of the reproducing head narrower than that of the recording head, and simultaneously provides the exact axial alignment within a single track of both heads. The inaccuracy of the screen thickness between the tracks is of no importance for the scale of the tracks of the head; as this scale is determined during the cutting process and kept true during the entire mounting owing to the material excess. This is impracticable when individually machining each head, where just the screen- and paramagnetic-separator thickness an the accuracy of stacking are determinative of the distance of the tracks. Moreover, experience shows that the stacking of individual heads is much more complicated in case of multi-track, two-gap heads especially in view of the ISO Standard recommendations for digital record after NRZ or PM system on a ½" tape.

Another version of a magnetic head produced by the method according to the invention provides a magnetic bridging-over of individual track heads wherein the bridging-over has specified magnetic resistance with respect to the magnetic resistance of actual circuits of the track heads, and permits the elimination of resin as a bonding material after the machining of a moulding is performed. Moreover the use of dynamic screens made of a single-piece rectangular-wave-shaped foil enables a facile grounding which in consequence provides more advantageous draining of the static charge gathering on the heads during the magnetic tape movement. The magnetic resistance of the circuits which form the tracks of a multi-track head may be so chosen that almost the whole magnetic flux closes in the magnetic circuit forming a single track of the head. A share of the magnetic flux transferred from the recording to the reproducing head is canceled in the common section of magnetic circuits, which section bridges over recording and reproducing heads, thus effecting in decrease of inter-head cross-talk.

An extra inter-head screen is used for further decrease of any stray field influence. Moreover, beside the grounded foil forming an electro-dynamic screen, magnetic screens are introduced into inter-track spaces to increase the screening efficiency and simultaneously screen by means of eddy currents induced in the electro-dynamic screen. The linearity of the gaps is obtainable due to the fact that the individual magnetic circuits are kept durably and stable by the common section of the ferrite material.

Figure 4:
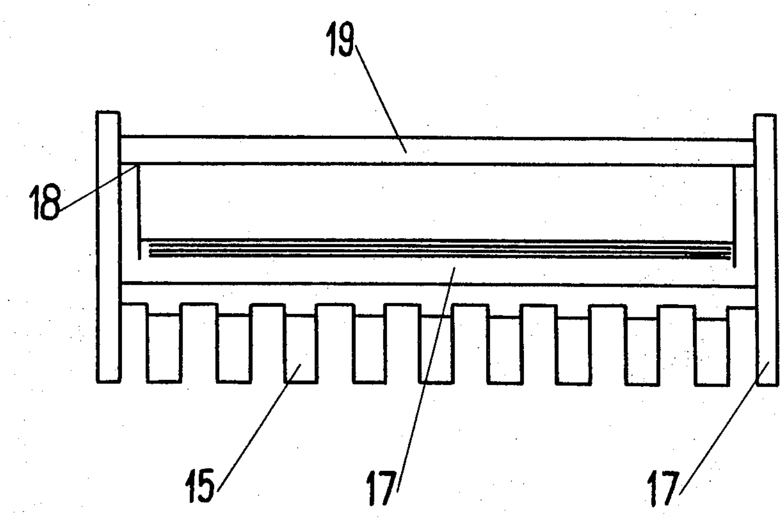
Figure 5:
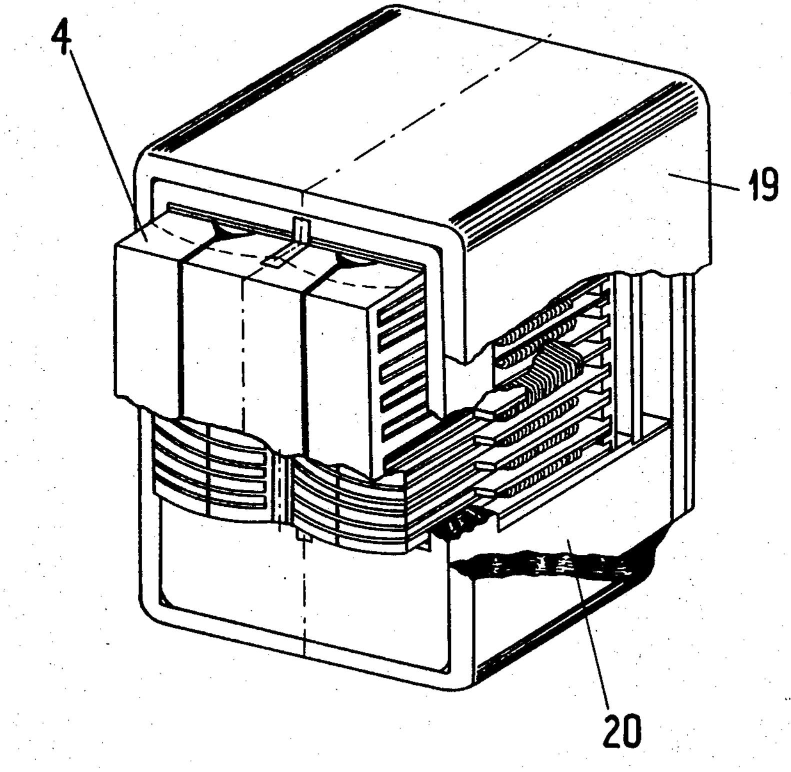
Figure 6:
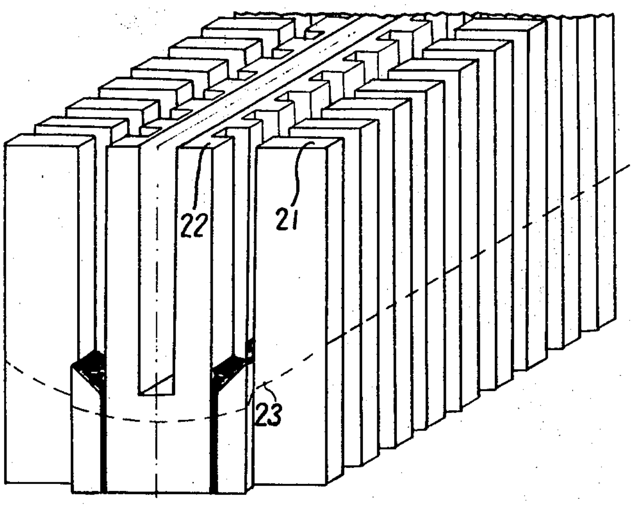
Figure 7:
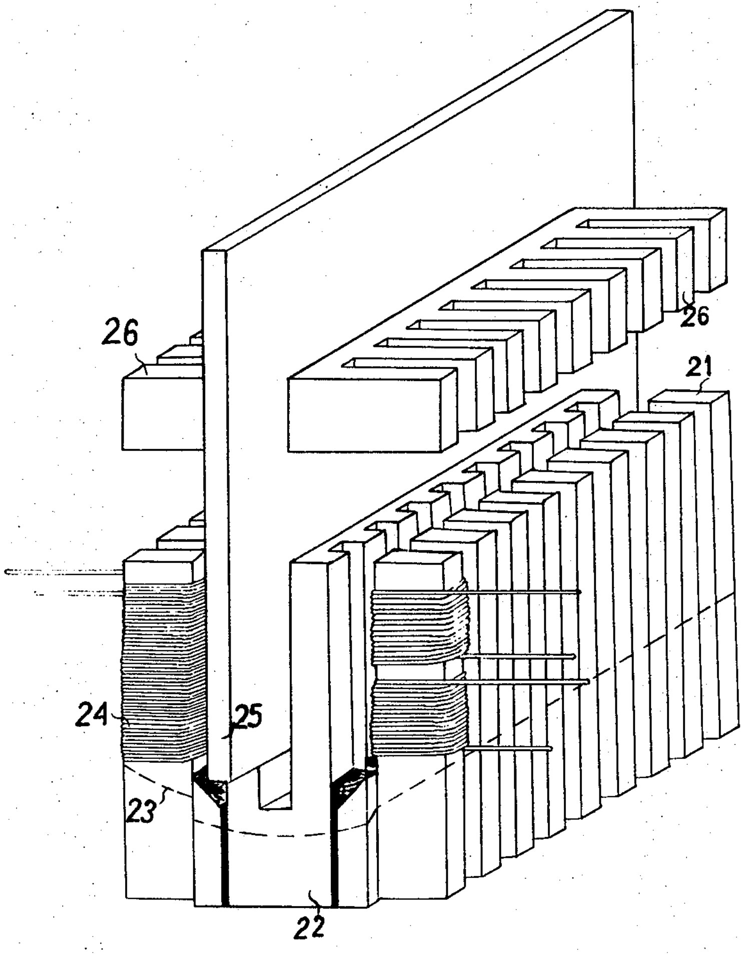
Figure 8:
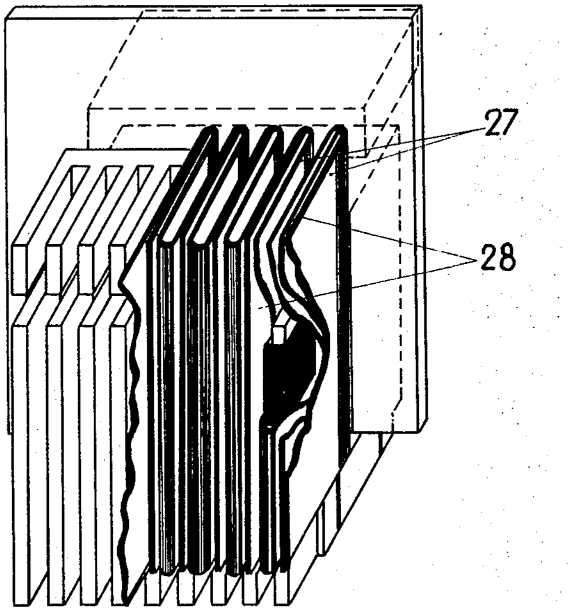

The assembly and necessary grounding of the head elements are facilitated due to rectangular-wave-shaped structure of the inter-track dynamic screen. The closer explanation of the invention is given in an example of the production process, with reference to the accompanying drawings, which show the machining sequence and the head structure. FIG. 1 shows how the body shapes forming the assembly block are prepared for bonding, FIG. 2 shows the assembly of bonded shapes, FIG. 3 shows the assembly of machined body shapes with coils and screens inserted, FIG. 4 shows the structure of the magnetic armature, FIG. 5 shows the head mounted in its housing, FIG. 6 shows the bonded shapes having asymmetrical circuits, this being a version provided with cuts, FIG. 7 shows the section of the head version having asymmetrical circuits with coils, armature and inter-head screens inserted, and FIG. 8 shows how an electrodynamic screen and magnetic inter-track screens are inserted.

FIG. 1 shows two ferrite body shapes 1 and 2. The body shape 1 will each become one of the external legs of individual track-head cores, while the body shape 2 will become the internal legs of the track-head cores, these being shielded from each other. The body shapes 1 and 2 are machined to the profile of the head cores, the linear dimensions of the body shapes being sufficient to provide a two-gap head including so called engineering excess, the meaning of which shall be explained hereinbelow, which is below the plane 4, and which is also above the plane 5. This excess is cut off after the bonding of body shapes 1 and 2. To facilitate grinding and to keep the mutual plane parallelity and perpendicularity of the body shapes 1 and 2 during the bonding process, the engineering excess above the plane 5 and having the shape as shown in the FIG. 1 is used. Thus the body shape height *h* after cutting off the excess above the plane 5, is slightly bigger than the nominal dimension of the core leg dimension, this being due to the excess material below the plane 4. During the machining of the body shapes 1 and 2 a high accuracy of the plane surface 3 must be maintained so as to provide smoothness, flatness and mutual parallelity of these surfaces in the body shapes 1 and 2. The surfaces 3 of the body shape 2 should be accurately parallel to each other because after stacking the body shapes 1 and 2, it is the surfaces 3 which determine the linearity and exactness—equality of dimensions—of the operating gap of individual elementary heads as well as their parallelity. After machining, the ferrite body shapes 1 and 2 are fixed in a special holder and bonded over the area of the surface 3 by means of glass having a melting temperature of about 500° C. The process of bonding the body shapes is carried out as follows: the body shapes 1 and 2 are stacked with the surfaces 3 spaced the specified distance due to the presence of foil petals 6 inserted between the body shapes along the gap edges. The foil excess is cut off during subsequent operations as an engineering waste. The thickness of the foil has the exact value of the intended operating gap. Glass aggregate of maximum grain size of 1 mm. is poured over the thus prepared gap. The glass when heated up to about 500° C. melts and fills up the space between the surfaces 3 of the body shapes 1 and 2, forming a fast bond of both body shapes over the whole of the surfaces 3. The required distance of gap axes i.e. 0.15" or 0.3" is easily obtainable due to the above described construction.

Figure 2:
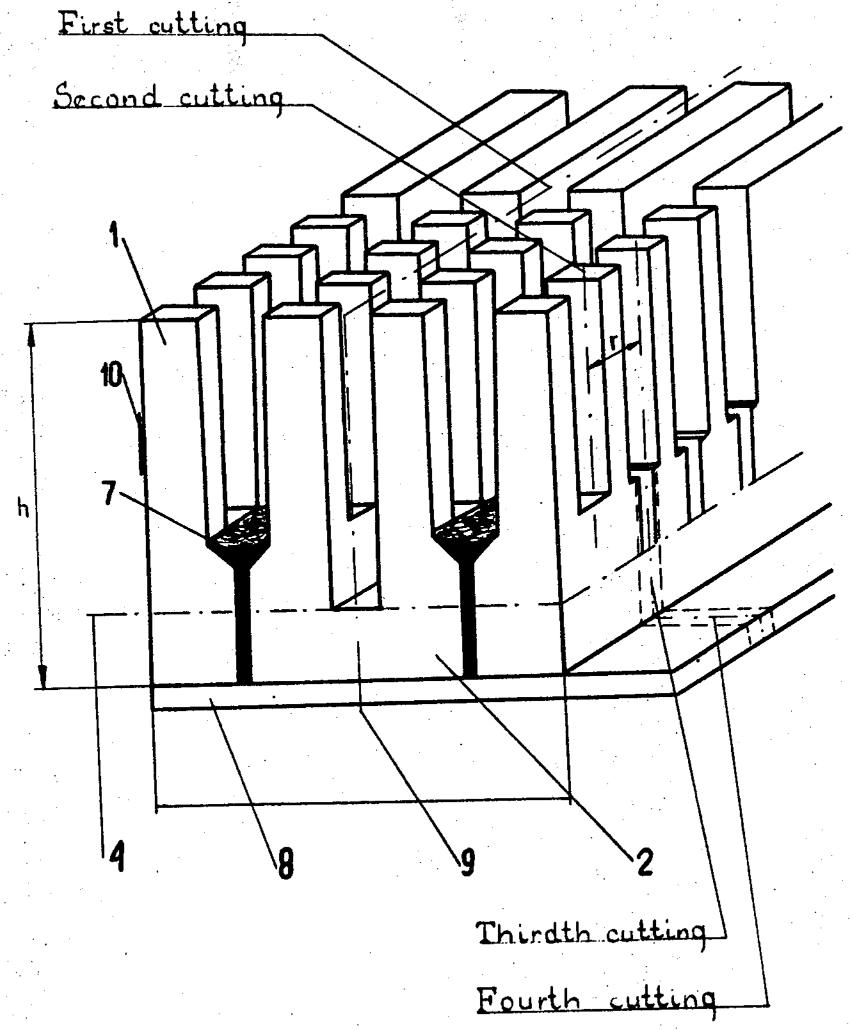

FIG. 2 shows assembly of body shapes 1 and 2 as bonded with glass, a glass nob 7 produced excess amount of glass poured over the gap being clearly visible. The nob 7 is provided since complete filling of the gap is thus assured and the mechanical strength of the bond is additionally increased, this being very important when further machining of the whole unit is performed. The joined body shapes 1 and 2 when cooled are set on a plate 8 and glued to it with an arbitrary organic material having good bonding properties of both materials at ambient temperature. The position of the face of the body shapes 1 and 2 when glued to the plate 8 must secure the required mutual parallelity and perpendicularity of planes, this being very important during the further machining operations and for obtaining proper dimensions and production allowances of the whole unit. During the first operation a channel is cut in the body shape 2 along the axis 9 down to the depth of the axis 4 by means of a diamond disc. The channel along the axis 9 divides the shape 2 into two sections, one of which is subordinate to the recording head and the other to the reproducing head. The cut along the axis 9 should be performed first to avoid cracks and spalling of the ferrite which might happen if the cut were performed after the operations of forming the legs of individual cores of track-heads have been completed. Besides, the depth of the cut down to the plane 4 divides the heads subordinated to both gaps within their nominal dimensions, the material below the plane 4 retaining them as one piece. During the second cutting operation, the assembly of body shapes 1 and 2 is cut along the axis of the inter-leg space down to the depth of the coil position when inserted into a ready made head, these cuts being transverse to the channel along axis 9. The width of the grinding wheel is so chosen that the subsequent cuts along the inter-leg spaces provides actual dimensions of the core leg sections, these being designed for locating the coils. During the third cutting operation in the assembly of shapes 1 and 2 the cuts made during the second cut operation are deepened down to the plane 4 by means of a suitably narrower grinding wheel, this being lead along the axes of already made cuts. The width of the grinding wheel in this case conforms with the dimension of the individual track distances for recording heads, the width of which is a little greater than that of the reproducing heads. When—to meet the ISO Standard requirements relating to the spacing of tracks on a ½″ tape used for tape memories—the distance of the recording heads is 0.3 mm., the maximum width of the head core is 1.1 mm. and the scale is 1.4 mm. The above cutting operations i.e. the second and the third cut, are performed along the complete length of the body shapes 1 and 2. After these operations, all the cuts are made to form the shape of a multi-track head having its individual track widths equal to each other for both recording and reproducing heads. The body shapes 1 and 2, when machined as described above, are cut during the fourth operation along the axes of individual inter-track spaces but through only one half of the whole unit. To obtain this, the whole unit is set on a perpendicular face 10 and the joined body shapes are cut along the axes of the cuts made during the third operation to the depth of the axis 9 and through the full height $h$ together with the plate 8. The width of the wheel is a little greater for this operation which results in obtaining the track heads a little narrower, as foreseen for the reproducing heads. So all of the cutting operations provide pole shoe profiles of different widths for recording track-heads and for reproducing heads, the linearity of gaps and the parallelity of the gaps of the recording track-heads with the gaps of the reproducing ones for all the tracks subordinate to both gaps being obtained. Though during the fourth operation the cutting is performed in the full leg height $h$ together with the plate 8 of the part which will become the reproducing heads, the assembly is still not separated as it is held by means of the ferrite excess material below the plane 4 in the second half of the unit and by the other part of the plate 8.

Figure 3:
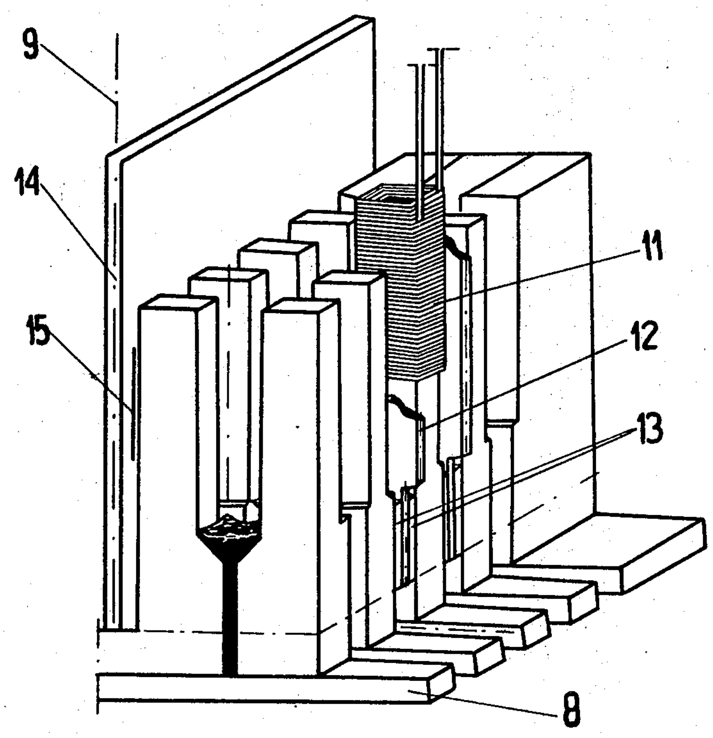

FIG. 3 shows the assembly of body shapes 1 and 2 and hollow coils 11 located on the narrowed section of the core leg. The external dimensions of the coils 11 are so chosen that they can be placed within the contour of the pole-shoe section of the cores with sufficient space remaining to receive a magnetic screen 12 and paramagnetic separators 13. After the coils 11 are placed, the magnetic screens 12 are introduced into the spaces between the individual tracks, the screens are separated from the ferrite of the pole-shoe sections of the core by means of the separators 13 which are always made of paramagnetic materials such as bronze, glass or the like. A magnetio-electric interhead screen 14 faced with antimagnetic separators 15 is introduced into the cut made along the axis 9 and fills it up. The heights of both the inter-track screen 12 and the inter-head screen 14 are so chosen that they can also comprise the spaces between armatures 16 (see FIG. 4) which close the magnetic circuits of individual track-heads in both multi-track heads.

FIG. 4 shows the structure of the magnetic armature 16 that closes the magnetic circuits of the individual track-heads. A ferrite plate having the thickness required for the height if the armature 16 is glued to an H-shaped bracket 17. After fixing the ferrite plate is cut into segments so that the individual armatures have a width a little greater than the width of the leg and the leg axes are exactly coincident with the armature axes.

The cuts of the armatures 16 are made down to the depth a little greater than the thickness of the ferrite plate in order to provide the magnetic opening and to make it possible to introduce the inter-track screens 12, which should comprise the full area of the head core surface, together with the armature 16. In the two-gap head structure there are used two units of magnetic armature, one for the recording head assembly and another for the reproducing head. The side plates of the bracket 17 determine the space corresponding to the dimensions of the multi-track head and so they can be used as the elements limiting in a certain range the armature 16 offset against the core legs. On the opposite side of the bracket 17, on edges 18 there is located a plate 19 provided with terminals for connecting the coils of individual heads and the wires connecting the coils with a multi-way plug.

FIG. 5 shows an entire unit of a multi-track, two-gap head after assembling, cutting off the plate 8 and placing it in a metal housing 19. On the drawing there is also visible a plate 20 located between the housing and the multi-track two-gap head which can be provided with threaded holes not shown for fixing the head in its operating portion. The ferrite shape assembly forming the head, after being assembled but prior to be arranged in the housing, is covered with an epoxy resin layer which solidly binds the individual components together. It is very important that the resin coating is not obtained by dipping but should be be done by applying a thin film of the resin—e.g. painting with a brush—for too much resin may cause undesired mechanical stress during the hardening process which results in cracking of the ferrite shapes. The strength of the epoxy resin layer should be sufficiently high to prevent, together with the housing, any offset of the individual head components during performance as well as during the grinding of the head face. Moreover the resin layer should provide the whole unit with good mechanical resistance against any outside influences and temperature. The material of the housing should have a coefficient of linear expansion similar to that of the ferrite. The head arranged in the housing, after all the assembling operations are completed, still represents a mechanically inseparable unit of shapes held by means of the ferrite excess placed below the plane 4 and the bonding material which joins the shapes over the surfaces 3, in spite of removing the fixing plate 8. When grinding and polishing the head face, the ferrite excess material is taken off just above the plane 4 so all the track-heads of the multi-track two-gap head are magnetically separated and simultaneously the proper curvature of the head face is shaped for securing a suitable cooperation with magnetic tape.

FIG. 6 shows an assembly of cut body shapes, which form the core of a two-gap, multi-track head, the assembly being another embodiment which consists of body shapes 21 designed for external legs of head cores and a body shape 22 provided with a gap for an interhead screen, and having the form of a regular cubicoid shaped to provide internal legs of head cores. The body shapes 21 having a material excess on one side are bonded with the body shape 22 by means of glass cement applied between facing surfaces, thus forming a mechanically inseparable unit. The cuts shown in FIG. 6 are made along the axes of inter-track spaces and along the longitudinal symmetry axis running through the body shapes 22. The first cut along the inter-track axes is led along both shapes 21 and separates them into individual track-head legs, the grinding wheel having a width corresponding to the distance between the track-heads making small depth cuts in the body shape 22. The second cut is also made along the inter-track axes and led along both shapes 21 but a little wider grinding wheel is used to decrease the width of the track-head core legs, this being essential in obtaining a space for placing the coils within the width of the individual tracks. During cutting the grinding wheel is introduced to the depth of the external track-head cores. The third cut is made along the longitudinal symmetry axis of the shape 22 to produce a space for introducing an inter-head screen, provided that the depth of the cut must not result in separating individual track-heads even after the face grinding along the line 23. Two body shapes 26 in the form of a comb having the cuts spaced according to those forming individual track-heads provide the armature of the head.

FIG. 7 shows the cut ferrite body shapes 21 and 22 forming asymmetric cores of individual track-heads, the external legs of the cores being provided with hollow coils 24. An inter-head screen 25 is inserted into the cut made in the shape 22.

The multi-track, two-gap head having inter-track magnetic and dynamic screens as shown in FIG. 8 is arranged of so cut body shapes 21 and 22 together with fitted coils and armatures 26. A dynamic screen 27 made of Phosphor bronze strip shaped in the form of a rectangular wave enfolds the legs of body shape 21 and is introduced into the cuts in the body shape 22. Magnetic screens 28 in the form of plates of magnetic material are additionally introduced. The strip 27 forming the dynamic screen is shaped in such a way that every track-head is enfold with it on both sides and the surfaces of the screen are separated by the magnetic screen 28.

What we claim is:

1. A method of producing multi-track, two-gap ferrite magnetic heads comprising; providing three ferrite body shapes, one having a pair of oppositely disposed plane gap-forming surfaces thereon and the other two each having a plane gap-forming surface, each body shape being of a greater height than the said heads to be made therefrom to therby provide excess material, placing said body shapes in juxtaposition with said surfaces spaced a predetermined distance apart to provide two gaps, bonding said body shapes together by filling the said spaces with a bonding material, cutting slots in said assembled body shapes to provide multiple pairs of heads and a pair of core legs for each head, and removing at least part of said excess material.

2. The method of claim 1, wherein a first slot is cut into said one body shape from the end thereof opposite said gap forming surfaces toward said gap forming surfaces along an axis lying between said two surfaces and to a predetermined depth, assembling said body shapes in a housing and separating said assembled shapes into multiple two gap heads by removing excess material adjacent said gap forming surfaces in a direction oppositely to said first cut and to said first cut.

3. The method of claim 1, wherein after said bonding together of said body shapes, said assembled body shapes are fastened to a plate to which each of said body shapes is secured.

4. The method of claim 1, wherein the spacing of said surfaces is obtained by placing foil therebetween.

5. The method of claim 1, wherein the bonding material in the spaces between said surfaces is glass which becomes molten at an elevated temperature and which comprises, before melting, aggregate having a maximum grain size of about 1 mm.

6. The method of claim 1, wherein screens and separators are assembled into the spaces betwen said core legs, and said thus assembled structure is coated with a thin epoxy resin coating.

7. The method of claim 1, wherein said cutting of slots comprises cutting a first slot in said one body shape to a predetermined depth along an axis lying between said two surfaces and cutting plural second slots parallel to each other and transverse to said first slot in said bonded together body shapes to said predetermined depth.

8. The method of claim 7, wherein said cutting of slots further comprises cutting third slots along the axes of said second cut slots and deeper into those body shapes which will become recording heads, said third slots being narrower than said second cut slots.

9. The method of claim 8, wherein said cutting of slots further comprises cutting fourth slots into those body shapes which will become reproducing heads along the axes of said second slots and past said predetermined depth to separate adjacent track heads to provide one set of heads on each track having a greater width than the other set of heads on the same track.

10. The method of claim 1, wherein excess material exists adjacent said gap forming surfaces and at the ends of said body shapes opposite therefrom, and wherein said latter mentioned excess material is removed and then said slots are cut in said body shapes, and excess material is removed from adjacent said gap forming surfaces.

11. The method of claim 10, wherein after said slots are cut in said body shapes, windings are placed on said core legs, providing screens in said slots to isolate the legs of each head, filling spaces within said structure with resin, placing said structure in a housing, and thereafter removing said excess material from adjacent said gap forming surfaces.

12. The method of claim 1, wherein a first slot is cut into said one body shape from the end thereof opposite gap forming surfaces along an axis lying between said two surfaces and to a predetermined depth, and thereafter placing an inter-head screen in said first slot.

13. The method of claim 1, wherein the cutting of slots comprises cutting a first slot into said one body shape from the end thereof opposite said gap forming surfaces toward said gap forming surfaces along an axis lying between said two surfaces and to a predetermined depth, and thereafter cutting additional slots transversely of said first cut slot in said other bodies and partially through said one body, whereby to leave magnetic short circuiting material between individual heads.

14. The method of claim 13, and further comprising positioning a dynamic screen of rectangular wave shape between individual heads.

15. The mehod of claim 1, wherein the cutting of slots comprises cutting a first slot into said one body shape from the end thereof opposite said gap forming surfaces toward said gap forming surfaces along an axis lying between said two surfaces and to a predetermined depth, and wherein the removing of excess material comprises the removing of less than all of the excess material adjacent said gap forming surfaces in a direction oppositely to said first cut slot to thereby leave excess material which connects adjacent recording and reproducing heads.

References Cited

UNITED STATES PATENTS

| | | | |
|---|---|---|---|
| 3,224,073 | 12/1965 | Peloschek | 29—603 |
| 3,246,383 | 4/1966 | Peloschek et al. | 29—603 |
| 3,353,261 | 11/1967 | Bradford et al. | 29—603 |
| 3,402,463 | 9/1968 | Bos et al. | 29—603 |

JOHN F. CAMPBELL, Primary Examiner

C. E. HALL, Assistant Examiner

U.S. Cl. X.R.

179—100.2